E. W. GOODRICK.
MACHINE FOR MAKING GRASS TWINE.
APPLICATION FILED SEPT. 1, 1903.
951,391.
Patented Mar. 8, 1910.
8 SHEETS—SHEET 1.
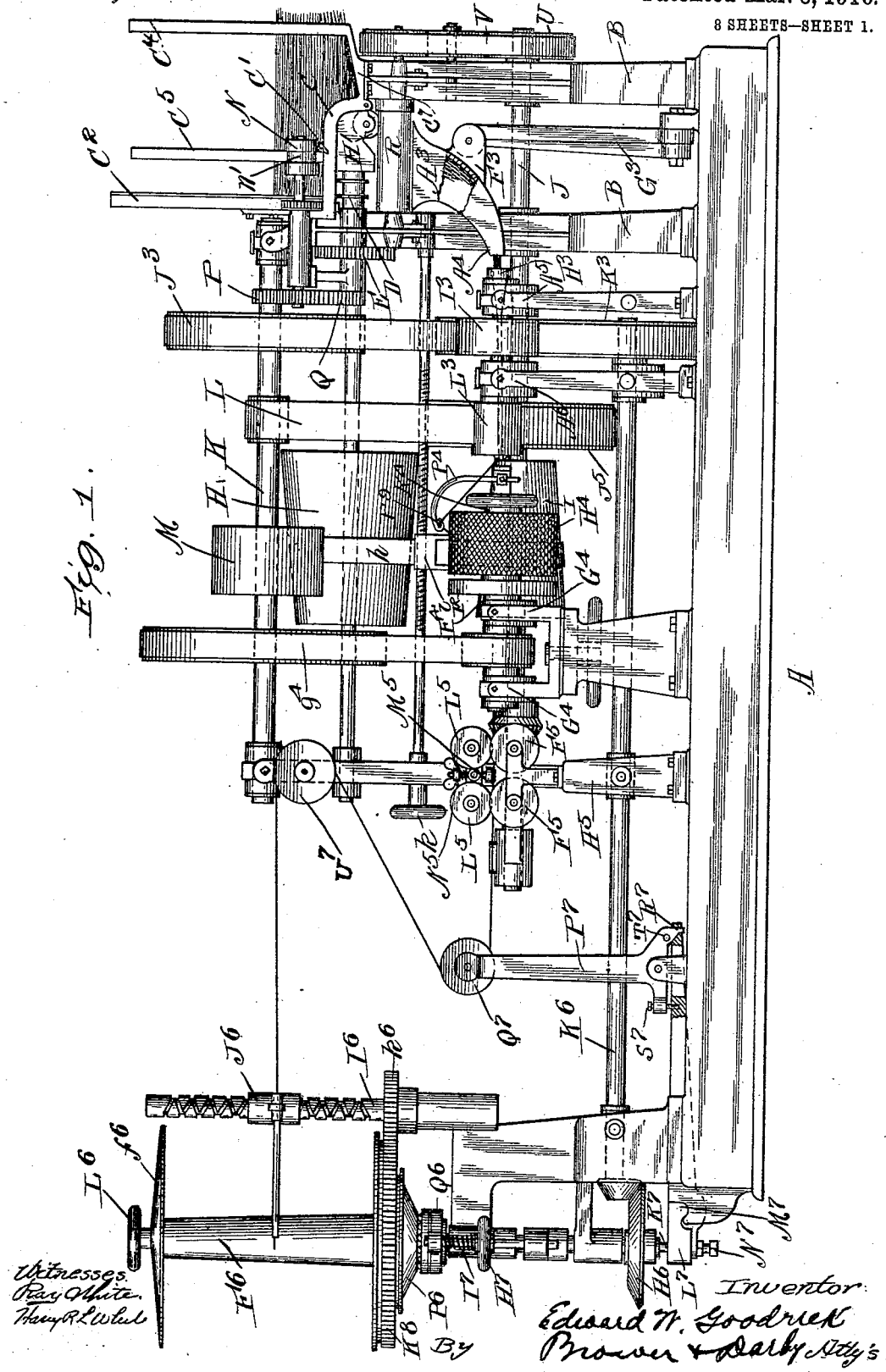

E. W. GOODRICK.
MACHINE FOR MAKING GRASS TWINE.
APPLICATION FILED SEPT. 1, 1903.
951,391.
Patented Mar. 8, 1910.
8 SHEETS—SHEET 2.
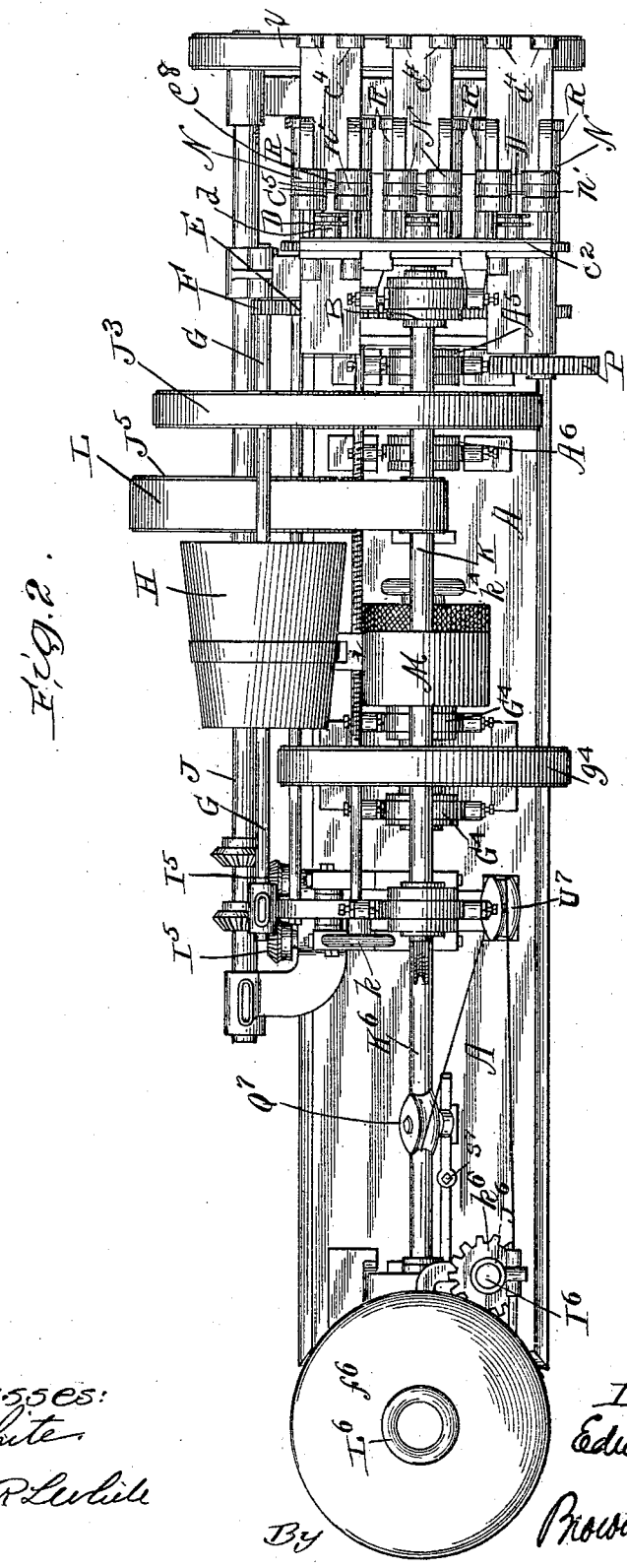

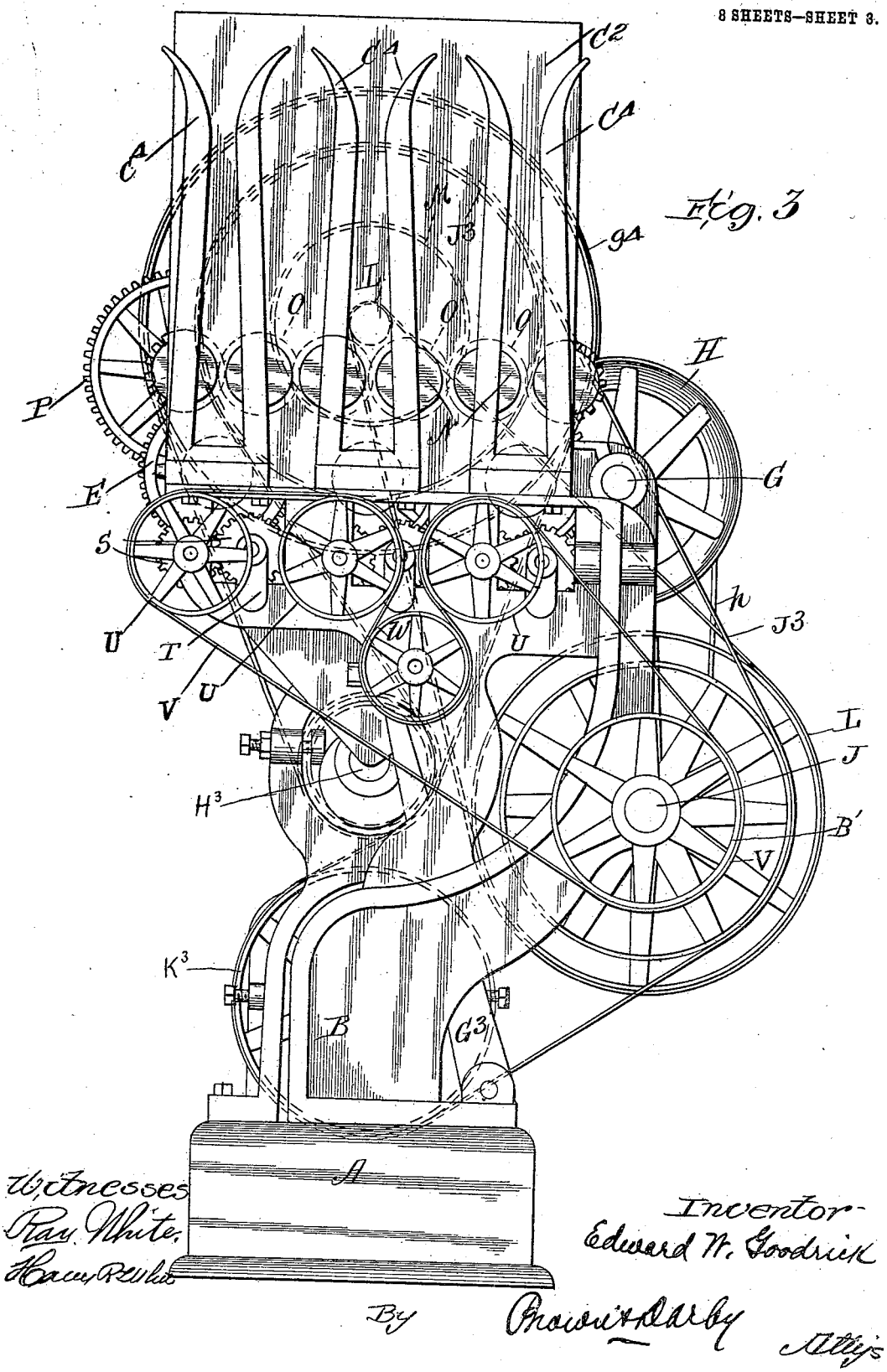

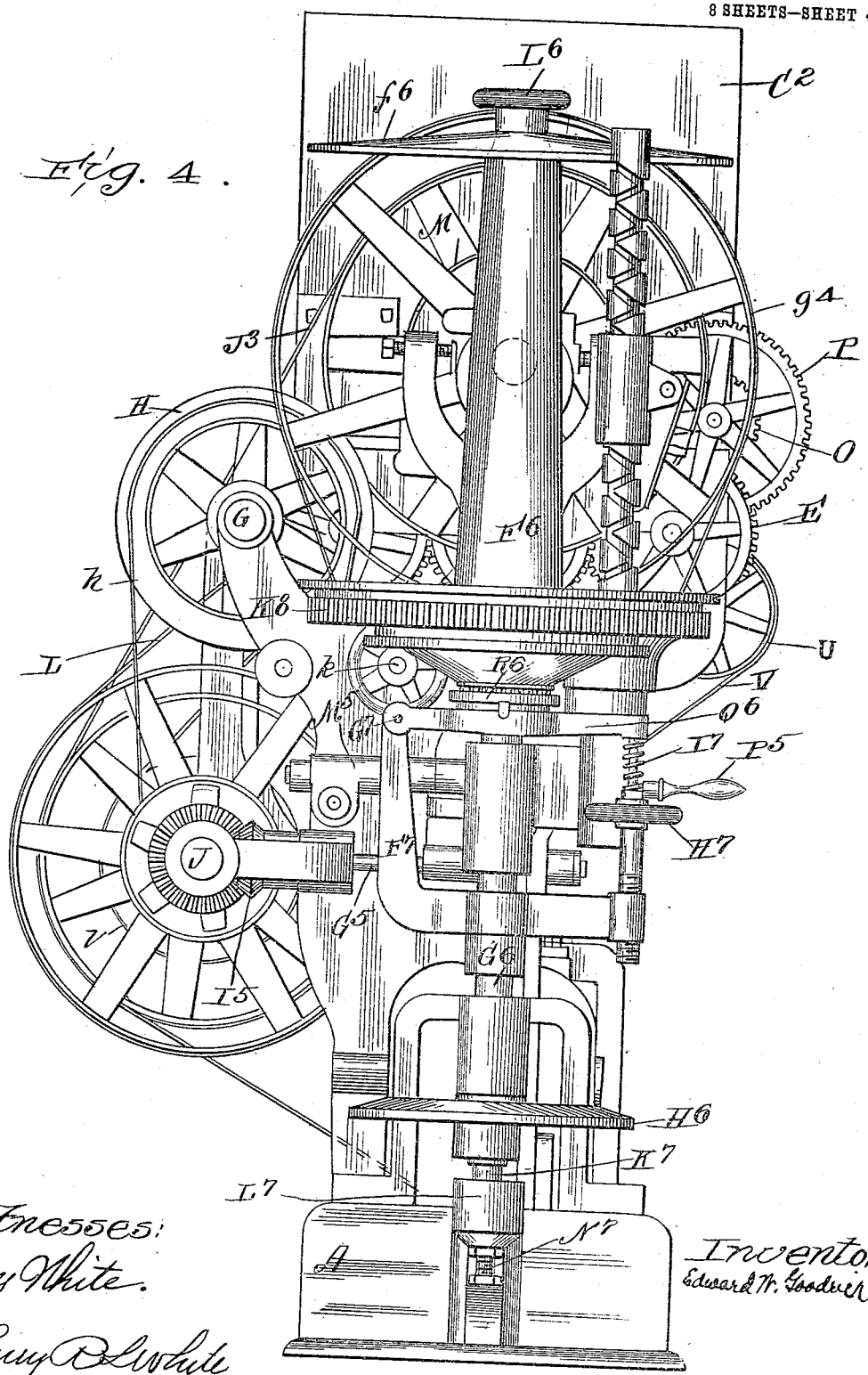

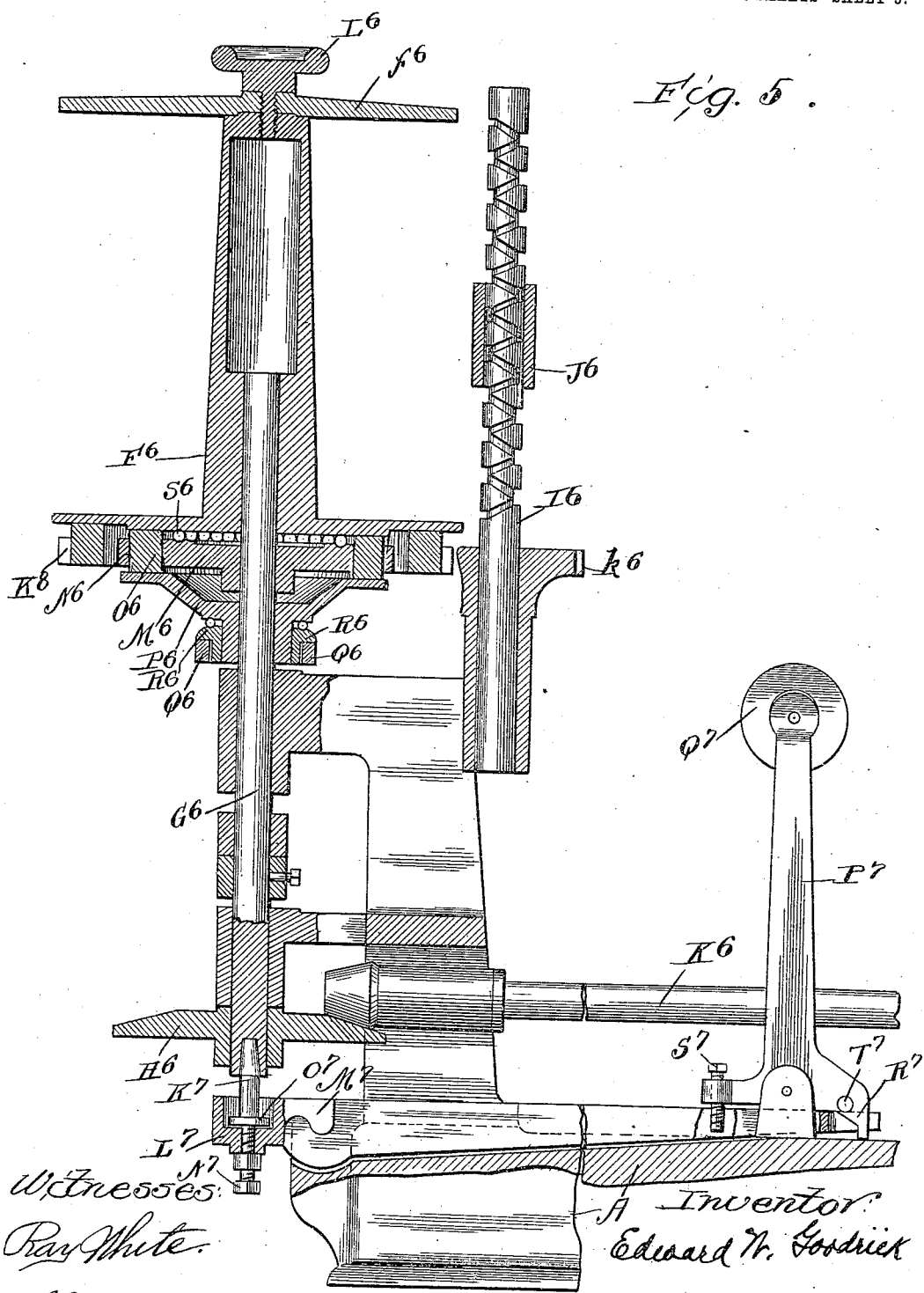

E. W. GOODRICK.
MACHINE FOR MAKING GRASS TWINE.
APPLICATION FILED SEPT. 1, 1903.
951,391.
Patented Mar. 8, 1910.
8 SHEETS—SHEET 6.
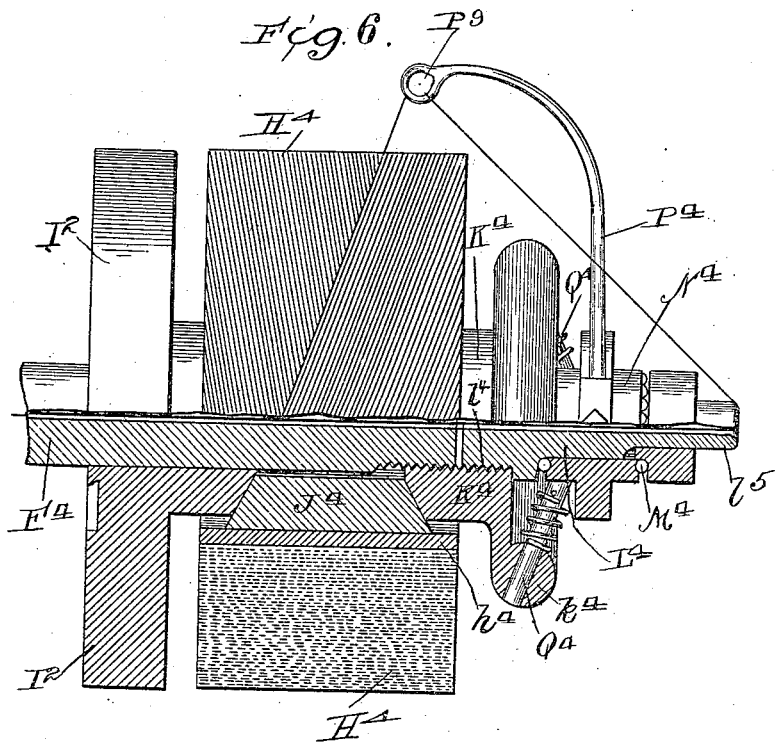
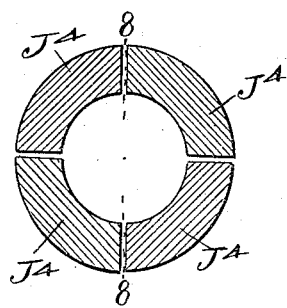
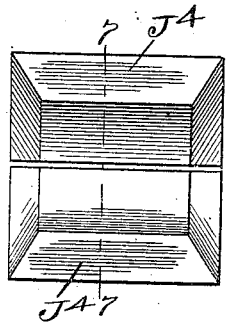

E. W. GOODRICK.
MACHINE FOR MAKING GRASS TWINE.
APPLICATION FILED SEPT. 1, 1903.
951,391.
Patented Mar. 8, 1910.
8 SHEETS—SHEET 7.
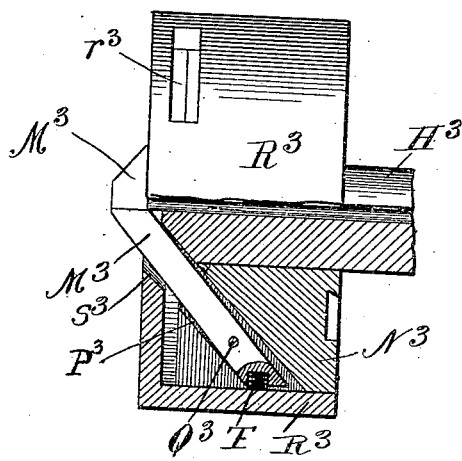
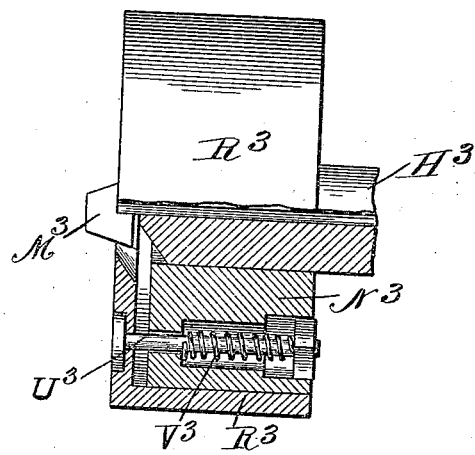
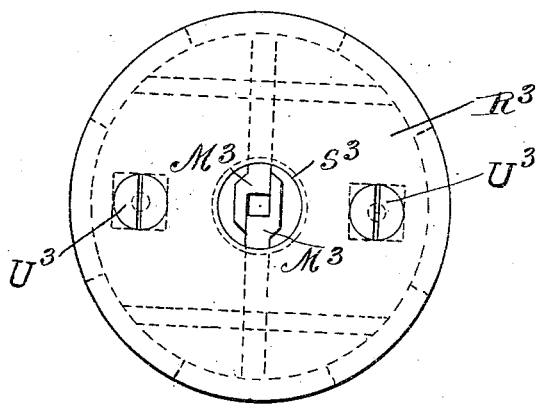
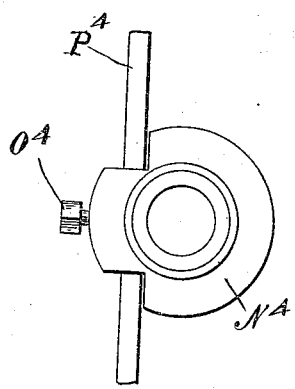
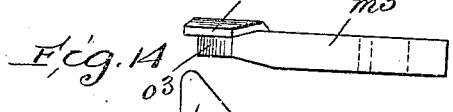
Witnesses:
Ray White
Harry R. Leviste
Inventor:
Edward W. Goodrick
By Brown & Darby
Atty's.

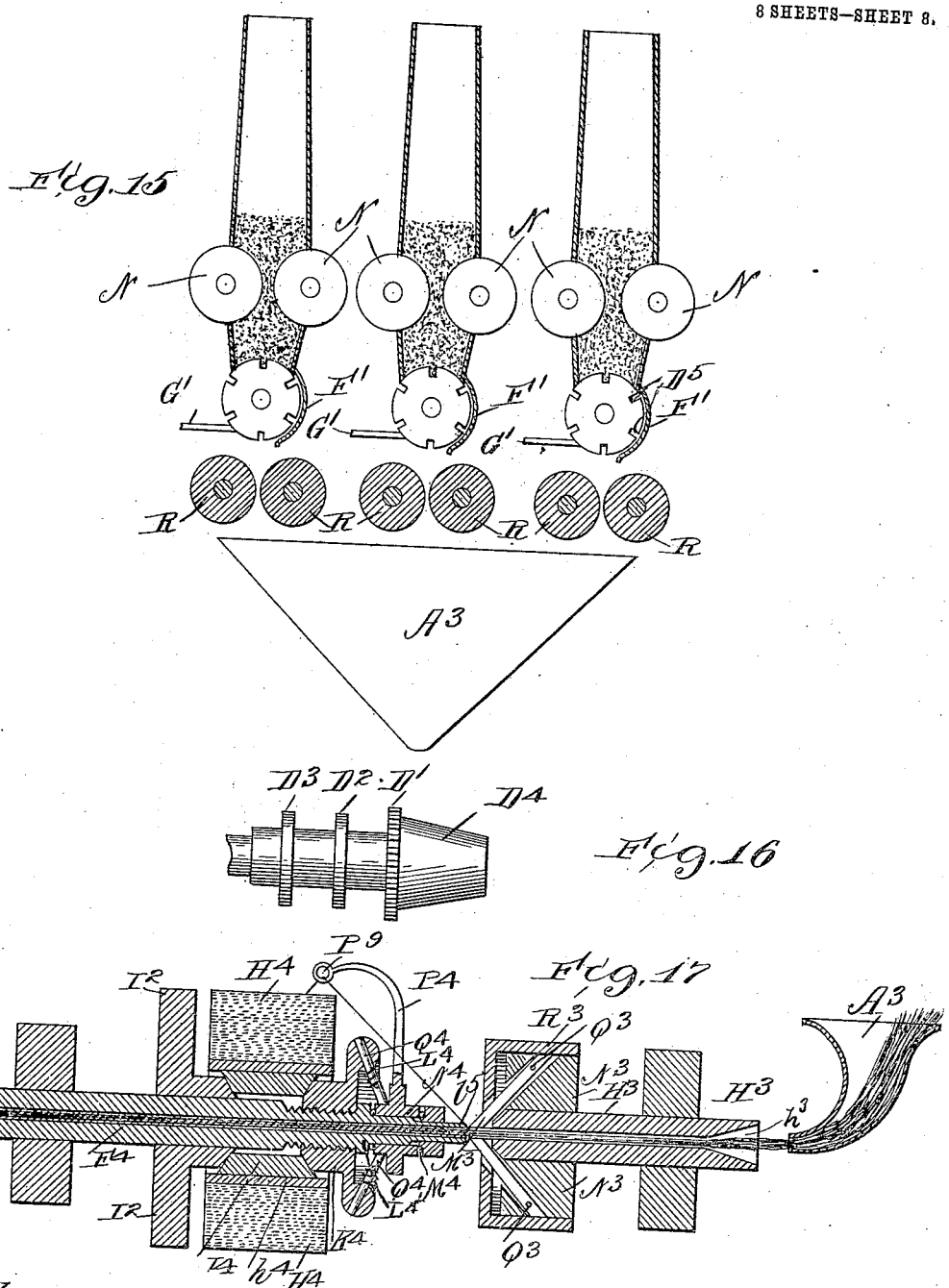

UNITED STATES PATENT OFFICE.

EDWARD W. GOODRICK, OF ST. PAUL, MINNESOTA, ASSIGNOR TO AMERICAN GRASS TWINE COMPANY, OF ST. PAUL, MINNESOTA, A CORPORATION OF DELAWARE.

MACHINE FOR MAKING GRASS TWINE.

951,391.      Specification of Letters Patent.      Patented Mar. 8, 1910.

Application filed September 1, 1903. Serial No. 171,571.

*To all whom it may concern:*

Be it known that I, EDWARD W. GOODRICK, a citizen of the United States, residing at St. Paul, in the county of Ramsey and State of Minnesota, have invented a new and useful Machine for Making Grass Twine, of which the following is a specification.

This invention relates to machines for making grass twine.

The object of the invention is to provide a machine for making grass twine which is simple in construction, efficient in operation, and economical in manufacture.

A further object of the invention is to provide a feeding mechanism for the stems, stalks or filaments of grass or other fiber, which picks the stems, stalks or filaments from a pile or bundle thereof held *en masse*, and which operates to feed the stems, stalks or filaments, thus picked, forward in a uniform manner, and wherein the feed thereof may be regulated as desired.

A further object of the invention is to provide a twisting mechanism for the stems, stalks, spears or filaments, constructed to automatically compensate for irregularities in the size of the stems, stalks, spears or filaments acted upon thereby.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon,—Figure 1 is a view in side elevation of a machine embodying the principles of my invention. Fig. 2 is a top plan view of the same. Fig. 3, is a view in end elevation looking from the right in Fig. 1. Fig. 4 is a view similar to Fig. 3, looking toward the left-hand end of Fig. 1. Fig. 5, is a view in vertical central section through a receiving reel embodying the principles of my invention, parts being broken off. Fig. 6, is an enlarged broken detail view, half in vertical central longitudinal section, half in side elevation showing a construction of thread-carrying spool and manner of mounting the same, and a thread tension device embodying the principles of my invention. Fig. 7, is a detail view in section on the line 7, 7, of Fig. 8, of a form of bushing employed in securing the thread carrying spool upon its supporting shaft. Fig. 8, is a detail view in section on the line 8, 8, of Fig. 7. Fig. 9, is a detail end view of a portion of the mechanism shown in Fig. 6, the thread guide being shown in a different position of adjustment from that shown in Fig. 6. Fig. 10, is a broken detail view, half in central longitudinal section and half in side elevation, of a twisting device embodying the principles of my invention. Fig. 11, is a view similar to Fig. 10, with the twisting device rotatively displaced through an arc of ninety degrees. Fig. 12, is an elevation of the left-hand end of the construction shown in Figs. 10 and 11. Fig. 13, is a detached detail edge view of a form of twister jaw embodying the principles of my invention. Fig. 14, is a view in side elevation of the twister jaw shown in Fig. 13. Fig. 15, is a detail view somewhat diagrammatic of the hoppers containing the mass of stems, stalks or fibers and the associated picking and feeding mechanisms. Fig. 16, is a detached broken detail view of a picking disk and associated parts. Fig. 17 is a detached broken detail view in central longitudinal section of a form of twine twisting and thread wrapping mechanism embodying the principles of my invention.

The same part is designated by the same reference sign wherever it occurs throughout the several views.

In the manufacture of grass or other twine it is desirable to produce a cord of uniform size and strength throughout. In order to accomplish this result the stems, stalks or fibers should be arranged and fed in proper and uniform order and succession, that is, such stems, stalks or fibers should lap-joint uniformly throughout the length of the cord, and it is desirable that the proportion of coarse and fine stems, stalks or fibers be the same at any point of cross section throughout the length of the twine. The stems, stalks or fibers ordinarily employed form a heterogeneous mass with coarse as well as fine, small or slender stems, stalks, or fibers intermingled or interspersed irregularly throughout the mass or bunch. In accordance with the principles of my invention, I propose to employ mechanism for picking the stems, stalks, spears, or fibers promiscuously, and from various points from masses or bunches of such fiber, whereby the irregularities and variations in degree of coarseness or fineness of the individual stems, stalks, spears, or fibers tend to average themselves so that the resultant twine product is substantially uniform throughout. I also propose to employ means for feeding the stems, stalks, spears or fiber so selected and picked from the mass in successively intermittent and uniform order and relation.

Referring to the accompanying drawings, reference sign A, designates the frame of the machine, having such construction and arrangement as will enable it to support the various parts of the mechanism. Upon standards B, B, of the frame is arranged and supported the hopper or fiber supporting rack, indicated generally by reference sign C, see Fig. 1. The fiber supporting rack may be of any suitable or convenient construction and arrangement. In the particular form shown in Figs. 1 and 3, to which, however, my invention is not to be limited or restricted, I employ a plurality of racks or hoppers, each comprising a bottom board or floor $C^1$, and vertically extending arms $C^4$, $C^5$, arranged in pairs. Masses or bunches of the stems, stalks, spears or fibers are designed to be placed within the hoppers formed by the pairs of arms $C^4$, $C^5$.

$C^2$, designates an end board or plate against which the butt ends of the fibers engage when the fibers are placed within their retaining racks. The fibers are arranged in parallel relation with respect to each other in their retaining racks and may be placed within such racks by hand or in any other convenient manner *en masse*.

Various forms of devices may be employed for successively picking and deflecting the ends of the fibers from their retaining racks and into position to be grasped and fed through the machine in uniform lap-joint relation and at uniform intervals of time. In the accompanying drawings I have shown a simple and efficient construction for accomplishing this result wherein I employ in connection with each hopper or rack a deflecting or feed mechanism indicated generally by reference sign D, Fig. 1, and which will presently be more particularly referred to. The deflecting or feed mechanism shown comprises disks mounted upon shafts driven in any suitable manner. In the example shown the feed or deflecting disk shafts carry intermeshing gears E, one of which being driven by a pinion F, see Fig. 2, mounted upon shaft G. Rotation may be imparted to shaft G, in any suitable or convenient manner, as for instance, through a belt $h$, operating over a cone pulley H, on shaft G, and an operating cone pulley I, carried upon a countershaft J, said shaft J, being driven from the main drive shaft K, in any suitable manner, as for instance, by means of a belt L, see Fig. 1. The main drive shaft K, may be driven from any suitable or convenient source of power through the drive pulley M, thereon. The belt $h$, which transmits motion from shaft J, to shaft G, may be shifted longitudinally of the cone pulleys H, I, in order to vary the speed ratio of said shafts, and hence also of the feed and deflector devices according to the requirements of the machine. The shifting of belt $h$, may be effected in any suitable simple or convenient manner, as for instance, by means of a shipper $i$, see Fig. 1, controlled by a screw shaft operated by a hand wheel $k$, or otherwise.

It is obvious that the driving arrangement may be modified and varied in many ways. I do not desire, therefore, to be limited or restricted to the particular details of construction and arrangement shown.

In order that the ends of the fibers contained in the racks may be efficiently engaged and deflected by the deflecting devices, it is desirable to positively press or crowd the fibers downward through their retaining racks, and upon the feeding or deflecting disks, which, as indicated in the diagrammatic illustration of Fig. 15, operate in the respective racks at the bottoms thereof. In order to accomplish this result I have shown a convenient arrangement, to which, however, I do not desire to be limited or restricted, wherein I employ in connection with each fiber retaining rack a pair of feed rolls N, which, if desired, may be made of, or covered with, rubber or other yielding rough or frictional material adapted to exert a gripping action upon the grass or fibers. The members of each pair of these feed rolls are arranged on opposite sides respectively of their racks with the peripheral surfaces thereof extending or projecting partially into the space between their associated pairs of vertical arms forming or constituting the feed rack, as indicated diagrammatically in Fig. 15. If desired, and as shown in Fig. 2, the feed rolls may be provided with peripheral grooves, indicated at $n^1$, see also Fig. 1, the vertical arms $C^5$, being accommodated in said grooves, whereby the portions of the periphery of the rolls N, on each side of the vertical arms project or extend into the space between the pair of arms $C^5$, constituting a portion of the rack in which the stems or stalks or fiber are received. The rolls N, may be rotated in any suitable or convenient manner, as for instance, by means of the intermeshing gears O, mounted upon the shafts of said rolls. Rotation is imparted to the train of gears O, from a gear P, see Figs. 1, 2, 3 and 4, carried by the shaft of one of the outermost rolls, and with which meshes a pinion Q, upon a shaft of one of the feed or deflector disks, the latter being driven in the manner above described. By this arrangement of drive gearing the pressure rolls N, are driven with a speed proportionate to that of the feed or deflector disks, and said feed rolls operating within the space between coöperating pairs of arms forming a feed rack serve to press or crowd the stems or stalks downwardly upon the peripheral surfaces of the deflector disks in the bottom of the hoppers or racks. In proper relation immediately below each feed or deflector disk is arranged suitable withdrawing or feeding mechanism, which, in the particular form shown, but to which my invention is not to be limited or restricted, comprises a pair of feed rolls R, driven through intermeshing gears S, S, see Fig. 3. These feed rolls if desired, may be roughened or corrugated, or formed or faced with rubber, or any suitable or convenient yielding rough or frictional material, whereby they are enabled to exert a gripping action upon the fibers. If desired the feed rolls may be made adjustable toward and from each other. I have shown a convenient arrangement for this purpose, but to which I do not desire to be limited or restricted, in which one of each pair of rollers is mounted on a swinging arm T, see Fig. 3, by which it may be moved toward and from its companion roller. These feed rolls may be driven by any suitable or convenient arrangement of driving means. I have shown a simple arrangement wherein belt V, operating over a pulley $B^1$, see Fig. 3, on countershaft J, is arranged to operate around pulleys U, on the shaft of one member of each pair of feed rolls R, and an idler $W^1$, as clearly shown.

In Fig. 15 I have shown a slightly different arrangement and form of construction of hopper, for receiving the stems, stalks or fibers *en masse*, and wherein a somewhat rectangular box constitutes each hopper and the feed rolls N, operate through openings in the sides of said box.

The feed or deflector devices, as shown in Fig. 16, and in one form of embodiment, to which, however, my invention is not to be limited or restricted, each includes disks $D^1$, $D^2$, $D^3$, and a conical portion $D^4$. The deflector disk $D^1$, is preferably of larger diameter than the other disks mounted upon the same shaft therewith, and, as shown in Figs. 15 and 16, is provided with peripheral notches or recesses $D^5$, therein. I prefer to make these notches comparatively small and rectangular in shape, and I arrange the disks $D^1$, to extend into the feed racks from beneath so that as the stems, stalks or fibers contained in the racks are crowded down upon the peripheries of the disks, they, or some of them, are forced laterally into the peripheral notches $D^5$, to the extent of the capacity of such notches. By making the notches of uniform area, and by rotating these disks through the feed racks or hoppers, it will be seen that a uniform feed of the stems or stalks or fibers is insured, that is, uniform in size of the stems or stalks or increments deflected successively by the operation of the deflector disks since only the number and size of stems or stalks or fibers sufficient to fill the notches or recesses to their capacity, are delivered or deflected by each notch in the operation of the deflector devices. In order to retain the stems or stalks or fibers within the notches or recesses, during the rotating movement of the disks, I employ curved guides $F^1$, see Fig. 15, and on the opposite side of the disks from the curved guides I employ strippers $G^1$, which operate with the disks to force the fibers, or the ends of the stems or stalks out of the notches after the extreme ends of the guides $F^1$, are cleared, and into the bite of the coöperating pair of rollers arranged therebeneath, and by which they are grasped or gripped through the rotation of said rollers and withdrawn longitudinally from the feed racks or hoppers, and by which rollers the stems or stalks are finally delivered into the chute or hopper $A^3$, suitably supported beneath such rollers, and which hopper is preferably funnel shaped, the upper and larger end thereof being of sufficient area or extent to receive the fibers delivered from the pairs of rollers R, and the lower end contracted to condense the fibers delivered to such funnel. The operation of this portion of the machine is as follows: The stems, stalks, spears or fibers are placed in the feed racks by hand or otherwise, and in such manner as to lie in parallel relation between the pairs of upright retaining arms $C^4$, $C^5$, see Figs. 1, 2, and 3, or in the boxes or receptacles shown in Fig. 15, with their butt ends abutting against the plate $C^2$. The presser rollers N, operate to crowd or press the fibers downwardly upon the exposed peripheries of the feed disks which operate through the bottoms of the racks. As the disks $D^1$ revolve, the fibers which are forced into the notches $D^5$, are deflected, their ends being bent downward below the feed disks. Since the fibers contained in a rack or hopper lie in contact with the peripheries of the disks, it will be seen that the notches select the fibers promiscuously from the mass contained in the rack, but only to the capacity of the notches, and, consequently, the irregularities in size of the fibers are averaged. By employing a plurality of deflecting devices, each of which maintains uniformity in the size of the bunches or individual fibers delivered, it is obvious that I secure great uniformity in the size of the product of the machine. As the stems or stalks or fibers reach their lowermost deflected position, they enter the bite of the rollers R, and are positively gripped and drawn, or fed downwardly by and between the pairs of said rollers, being stripped or drawn longitudinally out of the piles or masses in the hoppers or racks. In order to avoid injury to the stems or stalks as they are thus withdrawn from the feed racks, I prefer to employ anti-friction rollers H¹, see Fig. 1, over which such fibers are drawn.

I will now describe a construction and arrangement of devices and mechanism by which the stems, stalks or fibers are condensed, forwarded and formed into a twine and a wrapping thread applied spirally thereto to produce the finished twine product.

As above stated, the withdrawing and feed rollers deliver into a chute or funnel A³. This funnel is provided with a forwardly directed spout or orifice A⁴, see Fig. 1, and by reason of the funnel or contracting shape of the receiver A³, the stems or stalks or fibers deposited in the upper end thereof by the rollers R, become partially condensed so as to issue from the orifice A⁴, in a partially contracted stream. The funnel A³, is supported upon an arm F³, which is pivotally mounted upon the free end of an arm G³, which in turn is pivotally supported upon the frame work of the machine and upon an axis at right-angles to the pivotal axis of the arm F³, see Fig. 1. By this construction the position of the funnel may be adjusted or varied, as may be desired, or said funnel may be swung entirely out of the way to enable access to be had to the parts of the machine. The partially condensed stream of stems, stalks or fibers issuing from the orifice, A⁴, of funnel A³, enters the twine forming and thread wrapping mechanism. This mechanism may be of any suitable, desirable or convenient construction, adapted to form the stream of fibers into a twine and to apply spirally thereto a wrapping thread. In the particular form shown, to which, however, my invention is not to be limited or restricted, I arrange a hollow shaft H³, see Fig. 17, in alinement with the orifice of funnel A³, to receive the stream of stems, stalks or fibers therefrom. Shaft H³, is journaled in bearings A⁵, A⁶, see Fig. 1, formed in standards of the machine frame work, and a pulley I³, is mounted on said shaft adapted to receive rotation from a belt J³, driven from the main drive shaft K. If desired, and in order to facilitate the entrance of the stream of stems, stalks or fibers from funnel A³, said receiving end may be formed with a conical or funnel shaped mouth, as clearly shown in Fig. 17. Upon shaft H³, I mount a block, or frame N³, having inclined slides or channels formed therein to receive the shanks M³, of the twister jaws, said shanks being pivotally mounted within the block or frame N³, upon pivots Q³, see Fig. 10, the free ends of said twister jaws extending beyond the block N³, and through inclined slots S³, forming in a casing R³, mounted upon block N³, to slide in a direction longitudinally of shaft H³. Springs T, are arranged to engage the inner ends of the twister jaws and exert their tension in a direction to maintain said jaws, indicated generally by reference sign M³, separated from each other. The casing R³, may be normally pressed in a direction for the inclined walls of slots S³, to engage the free ends of the jaws to hold said jaws pressed yieldingly together. Many specifically different arrangements may be devised for accomplishing this purpose. I have shown a simple arrangement wherein headed bolts or rods U³, see Figs. 11 and 12, are arranged to pass through the flange of casing R³, and into a recess formed in block N³. Springs V³, surround the rods U³, and exert a pressure upon the latter to normally draw the casing R³, over the block N³, and in position for the inclined walls of slots S³, to engage and rock the shanks of jaws M³, so as to cause said jaws to close upon each other. In the particular form shown, but to which my invention is not to be limited or restricted, a pair of jaws is employed, said jaws having their twine engaging surfaces o³, see Figs. 13 and 14, presented toward each other. Each jaw is provided with a flanking flange p³, and when the jaws are assembled into grasping relation with respect to the forming twine, the flanking portion of one jaw, which is in effect an offset portion, laps past the twine engaging surface of the coöperating jaw, and on the opposite side of said surface from its flanking portion, thereby forming a grasping means adapted to confine the stems, stalks or fibers therein, while at the same time serving to compact the stems, stalks or fibers to a uniform degree, thereby resulting in a compact and uniform twine product.

By the construction above described it will be seen that the twister jaws are enabled to automatically yield outwardly, and this I regard as an important feature of my invention for the reason that thereby I am enabled to compensate for irregularities liable to be encountered in the persentation of stems or stalks of grass to the jaws, although it is my object with the feeding and selecting mechanism above described to minimize and to eliminate as far as possible irregularities in the stems, stalks or fibers operated on, my object being at every stage of the operation to reduce to the greatest possible extent the liability for irregularities to occur. By arranging the stems of the jaws diagonally and extending in the direction of progress of the twine through the machine the feed of the stems, stalks or fibers through the machine is made effective to slightly swing the jaws apart, said jaws rocking on their pivots, to the necessary extent, and automatically to yield to any enlargement or lack of uniformity in the size of the twine passing therebetween.

In order to permit of the escape of any dust or shreds of fibers which may become stripped off during the passage of the fibers through the jaws, I provide openings $r^3$, in the casing $R^3$, see Fig. 10.

By reason of the rotative movement imparted to the block carrying the jaws $M^3$, and the gripping action exerted by said jaws upon the fibers passing therebetween, it will be seen that a twist is imparted to the fibers to form the same into twine. From the twine forming mechanism the formed twine is next presented to the action of the wrapping mechanism by which a wrapping thread or cord is applied spirally therearound. Many specifically different constructions of wrapping mechanism may be employed without departure from the spirit and scope of my invention. While, therefore, I have shown, and will now describe, a construction of wrapping mechanism embodying the principles of my invention, I do not desire to be limited or restricted in the scope of my invention to the specific structure and arrangement shown.

Arranged in alinement with the shaft $H^3$, is a hollow shaft $F^4$, see Fig. 17, journaled in bearings $G^4$, formed in a bracket suitably supported upon the frame work of the machine. The hollow shaft $F^4$, is rotated through a belt $g^4$, operating over pulleys on said shaft $F^4$, and the main drive shaft K, respectively, see Fig. 1. The cop or ball of wrapping thread or twine $H^4$, having a carrier or spool $h^4$, is provided, and from which the wrapping thread is drawn for application to the twine. The thread carrier or spool may be mounted in any suitable or convenient manner. Preferably I propose to so mount such carrier or spool as to render the same readily removable whenever necessary, while at the same time I provide means for firmly holding the carrier or spool upon and to rotate with the spindle $F^4$. To this end I employ an expansible support for the carrier or spool and comprising a flanged collar $I^2$, mounted upon the spindle, said collar having a hub provided with a beveled end surface. Upon a threaded portion of the shaft $F^4$, I arrange an oppositely positioned threaded collar $K^4$, having a hand wheel $k^4$, whereby said collar may be adjusted toward and from the collar $I^2$. The collar $K^4$, is also provided with a hub portion having an inclined or beveled end surface. The beveled or inclined end surfaces of the hubs of the collars $I^2$, and $K^4$, form, coöperatingly, engaging means to receive therebetween a plurality of coöperatingly beveled blocks $J^4$, see Figs. 6, 7, 8 and 17. By adjusting the collar $K^4$, toward and from collar $I^2$, the blocks $J^4$, are forced outwardly, thereby clamping and securely holding the thread carrier or spool upon shaft $F^4$.

Any suitable or convenient guiding means may be employed for guiding the wrapping thread from the cop or spool to the point of application of the wrapping thread to the twine. In practice the thread is guided from the ball or spool $H^4$, to the end of the shaft $F^4$. I have shown a simple construction and arrangement of thread guide, which I have found efficient, and comprising a sleeve $N^4$, loosely mounted upon the shaft $F^4$. In practice, and as shown in Fig. 6, instead of mounting the sleeve $N^4$, upon shaft $F^4$, said sleeve is mounted upon an extension $L^4$, arranged in substantial alinement with shaft $F^4$, and exteriorly threaded so as to be screwed into the bore of the hub of flange $K^4$. Adjustably mounted in the sleeve $N^4$, is the shank of the thread guiding arm $P^4$, having an eye $P^9$, at its end, through which the thread passes from the ball or cop $H^4$, to the end $l^5$, of the extension or member $L^4$. In order to reduce the friction, if desired, a ball bearing indicated at $M^4$, may be mounted upon a reduced end of extension $L^4$, see Figs. 6 and 17. Brake pins $Q^4$, are slidably mounted in the hand wheel $k^4$, of collar $K^4$, and spring-pressed inward into engagement with the revolubly mounted sleeve $N^4$. The purpose of these brake pins is to arrest the rotation of the thread carrying arm when the machine is stopped. In the operation of the machine these brake pins are thrown outwardly by centrifugal force, thereby relieving the sleeve $N^4$, of any braking effort so far as said pins are concerned; but when the rotations of shaft $F^4$, are arrested the springs acting upon said brake pins force the same inwardly or longitudinally, into braking engagement with said sleeve $N^4$.

When a new spool of thread is to be supplied the extension $L^4$, is removed and then the collar $K^4$, and the spool carrier $h^4$, is slipped into place or removed as the case may be, and the parts $L^4$, and $K^4$, replaced.

In my application Serial No. 107,823, filed May 17, 1902, I have shown, described and claimed a machine of the same class as that to which the present invention relates, but I do not claim herein the construction shown, described and claimed in said application.

By adjusting the shank of the thread guide $P^4$, the position of the eye $P^9$, with reference to the diameter of the spool $H^4$, may be regulated. The thread guide is held in its adjusted position by set screw $O^4$, see Fig. 9. In Fig. 6, the thread guide is shown adjusted for a full spool of wrapping thread. In Fig. 9 the guide is shown adjusted for a spool of reduced diameter.

While the twine is being formed and wrapped in the manner above described, it is desirable to provide means by which the twine is drawn through the apparatus and delivered, and the crowding or buckling of the same inside the shaft prevented. I have shown a convenient arrangement for accomplishing this purpose, to which, however, I do not desire to be limited or restricted, in which pairs of feed rolls $F^5$, $L^5$, are arranged on shafts or axes extending transversely of the machine, and in position for the formed twine to be received and grasped, as clearly shown in Fig. 1. The rolls $F^5$, are journaled in a standard $H^5$, of the main frame, while the coöperating rolls $L^5$, are loosely mounted or journaled upon a pivoted frame $M^5$, arranged to be yieldingly pressed downwardly by an adjustable spring $N^5$. The frame $M^5$, is provided with a handle $P^5$, by which said frame may be raised whenever desired, to separate the rolls $L^5$, from their coöperating rolls $F^5$. The rolls $F^5$, may be positively driven in any suitable or convenient manner. I have shown said rolls, or the shafts thereof, provided with beveled gears $I^5$, arranged to intermesh with coöperating beveled gears mounted upon the countershaft J, and receiving rotation from main drive shaft K, through belt L, operating over pulley $J^5$, see Fig. 1.

The finished twine product delivered from the feed rolls is led to and wound upon a receiving reel. In accordance with the principles of my invention I propose to employ a reel to receive the twine product, and which is operated automatically and in unison with the twine forming mechanism, and upon which the twine is wound automatically; and it is among the objects and purposes of my invention to provide means whereby the speed of the reel is varied to accommodate or to compensate for the increasing effective diameter of the roll of twine product, reeled or wound upon the reel. Many specifically different constructions of reel and reel operating devices may be employed or devised for accomplishing these objects and purposes. While I have shown and will now describe one construction embodying the principles of my invention, I do not desire to be limited or restricted thereto.

Referring to the accompanying drawings, reference $F^6$, designates generally the receiving reel. This reel is loosely mounted upon a vertical shaft $G^6$, see Figs. 1, 4 and 5. Upon this shaft is mounted a friction cone or gear $H^6$, with which coöperates a corresponding driving friction cone or gear, upon a shaft $K^6$, suitably mounted in the frame of the machine, and upon which is mounted a pulley $K^3$, belted to the main drive shaft K.

$I^6$, designates a deployer shaft upon which operates the deployer $J^6$, in the ordinary manner. The deployer shaft is driven through a pinion $k^6$, mounted thereon and meshing with and driven by a gear $K^8$, mounted or connected to rotate with the receiving reel. The end flange $f^6$, of the receiving reel is made removable, being held in place by a hand bolt $L^6$, so that said flange may be removed to permit the roll of twine product wound upon the reel to be removed therefrom in the ordinary manner.

In order to secure the variation in speed of the receiving reel to compensate for the increasing diameter of the roll of twine wound thereon, I provide a frictional driving mechanism for the reel in which the driving shaft revolves at a comparatively high speed, and the required amount of motion is transmitted to the reel, the remainder being lost in the slippage of the friction mechanism. In accordance with this idea I secure a disk $M^6$, upon and to rotate with shaft $G^6$, and through the peripheral edge of disk $M^6$, I form a series of vertical openings $N^6$, and in these openings I loosely mount blocks $O^6$. These blocks rest upon and are supported by the peripheral flange of a disk $P^6$, loosely mounted on shaft $G^6$, and supported upon a frame or lever $Q^6$. If desired, an anti-friction or ball-bearing may be interposed between the disk $P^6$, and its supporting lever. The raceway of the ball-bearing is shown formed in a separate piece $R^6$, see Figs. 4 and 5, which is pivotally supported upon the lever $Q^6$. If desired, balls $S^6$, may be interposed between the disk $M^6$, and the reel, or the supporting end flange thereon. The lever $Q^6$, or one end thereof, is pivotally connected, as at $G^7$, to a bracket or standard $F^7$, of the main frame, see Fig. 4. The other end of lever $Q^6$, is supported upon a vertically adjustable rod, the vertical adjustment of which may be effected by means of a hand wheel or screw $H^7$. If desired, a spring $I^7$, may be arranged to form the immediate support for the end of lever $Q^6$, said spring being interposed between said lever and the hand wheel $H^7$, and exerting its tension or pressure upon the free end of lever $Q^6$, which pressure may be regulated by the hand wheel $H^7$, and so as to rock said lever in a direction to cause the disk $P^6$, to be pressed upwardly, thereby crowding the blocks $O^6$, into frictional contact with the lower surface of the end flange of the receiving reel. From this it will be seen that when the winding mechanism is operated and the disk $M^6$, revolves, it exerts more or less turning movement upon the reel through the frictional engagement of the blocks $O^6$. It will also be seen that the hand wheel $H^7$, regulates the amount of pressure thus exerted, and, consequently, the amount of winding tension imposed upon the reel.

In case of breakage of the twine, or stoppage of the supply, it is desirable to automatically arrest the operation of the receiving reel. In order to accomplish this result I propose to employ a stop motion for automatically throwing the reel out of gear. In the construction shown for accomplishing this result, but to which my invention is not to be limited or restricted, I support the reel shaft G⁶, endwise upon a movable support, whereby said shaft may be moved endwise to carry its bevel friction gear H⁶, into or out of contact with its driving gear upon shaft K⁶. To this end I pivotally mount a lever L⁷, upon the frame of the machine, as at M⁷. A seat is formed in the end of the lever L⁷, in which is received a short stud K⁷, upon which the end of shaft G⁶ rests. The stud K⁷, is provided with a flange O⁷, against which bears a set screw N⁷, tapped through the lever L⁷, to serve to adjust the height of the supporting stud K⁷.

An arm P⁷, is pivotally mounted upon the base frame of the machine and at its upper end carries a sheave or pulley Q⁷, around which the twine operates in its passage from the twine forming mechanism to the deployer and reel. The tension exerted by the twine in passing around the sheave or pulley Q⁷, in the normal operation of the machine, rocks the arm P⁷, toward the right, thereby causing a pin T⁷, carried in a lug R⁷, formed in the lower end of the lever, to engage the inner end of lever L⁷, and rock the same in a direction to raise its other end thereby raising stud K⁷, and hence also shaft G⁶, and raising the gear wheel H⁶, into engagement with its driving gear on shaft K⁶, thereby operating the reel. In case the twine should break or part, the arm P⁷, is relieved of the tension which rocked it and, under the influence of the weight of the shaft G⁶, and the parts associated therewith imposed upon the outer end of lever L⁷, said lever is rocked in the opposite direction to lower shaft G⁶, and hence disengaging its driving gearing and arresting the rotation of the reel. In order to limit this rocking movement of the arm P⁷, as above explained, a set screw S⁷, is tapped into the lever L⁷, and operates loosely through a sleeve formed on an extension of said arm, the head of said screw S⁷, limiting the extent of rocking movement of said arm under the influence of the tension of the twine. The twine passes directly from the twine forming mechanism to and around the sheave or pulley Q⁷, and thence to and around a guide sheave U⁷, suitably supported on the main frame, and thence to the deployer and reel, and the sheaves Q⁷, and U⁷, are so placed and positioned with reference to each other and to the twine forming mechanism, that the twine forms a loop around sheave Q⁷, thereby enabling the tension thereof to accomplish its work as above explained.

It is obvious that many different ways may suggest themselves to persons skilled in the art, by which the various operations of my machine may be accomplished, and many variations and changes in the details of construction readily adapted without departure from the spirit and scope of my invention. I do not desire, therefore, to be limited or restricted to the precise details shown and described. But Having now set forth the object and nature of my invention, and a construction embodying the principles thereof, what I claim as new and useful and of my own invention and desire to secure by Letters Patent, is:—

1. In a machine of the class described, means for supporting a mass of fibers, a plurality of rotary members having their peripheries arranged to enter the mass at different points to engage the ends of fibers in said mass, presser rolls for pressing the ends of fibers against the peripheries of said members, means for withdrawing the engaged fibers from the mass, and means for combining all of the withdrawn fibers into a continuous strand or twine.

2. In a machine of the class described, means for supporting a mass of fibers, a plurality of rotary members including disks having smooth peripheral portions and intermediate notches, and each arranged to enter the mass of fibers at a different point, presser rolls for pressing the mass of fibers against the peripheries of said disks, whereby said disks select and deflect ends of the fibers, means for engaging the deflected ends of the fibers and withdrawing the same from the mass, and means for combining the withdrawn fibers into a continuous strand or twine.

3. In a device of the class described, grass or fiber supporting means, disks having a smooth peripheral portion provided with spaced notches, presser rolls for pressing the grass against said disks, and withdrawing mechanism for withdrawing the fibers from the supporting means, as and for the purpose set forth.

4. In a machine of the class described, a plurality of means for supporting masses of fibers, a plurality of supporting shafts arranged beneath said fiber supporting means, a notched disk mounted upon each of said shafts and having its periphery extending into the mass of fibers to select and deflect ends of fibers from such mass, means for simultaneously rotating said shafts, means for withdrawing the deflected fibers, and means for combining the withdrawn fibers into a continuous strand or twine.

5. In a machine of the class described, a plurality of means for supporting masses of fibers, a plurality of shafts arranged beneath said fiber supporting means, a peripherally notched disk mounted upon each of said shafts and having its notched periphery extending into said fiber supporting means to engage and deflect the ends of the fibers therefrom, presser rolls for pressing the fibers against the peripheries of said disks, means for engaging and withdrawing from the mass the deflected fibers, and means for combining the withdrawn fibers into a continuous strand or twine.

6. In a machine of the class described, a plurality of grass supporting racks or hoppers, each having an opening in the base thereof at one end only, a rotary member arranged to extend through the opening in the base of each of said racks or hoppers to engage and deflect the ends of fibers therefrom, means for pressing the grass fibers or stalks upon said rotary members, presser rollers for withdrawing the deflected ends of the fibers and means for combining the withdrawn fibers into a continuous strand or twine.

7. In a device of the class described, a continuously rotating shaft having a plurality of feed disks, a cone on the forward end of said shaft, a withdrawing mechanism, the feed disks being arranged to deflect fibers of grass or other material along the elements of said conical surface, and into engagement with said withdrawing mechanism, as and for the purpose set forth.

8. In a device of the class described, a grass supporting rack or hopper having a plurality of guiding channels, or holding arms, presser rolls disposed in said channels or arms and arranged to feed the grass or fibers therein laterally with respect to themselves, and notched feeding disks at the terminations of said channels, as and for the purpose set forth.

9. In a device of the class described, a grass supporting rack or hopper having a plurality of guiding channels, presser rolls disposed in said channels, a fiber engaging and forwarding mechanism at the termination of said channels, as and for the purpose set forth.

10. In a device of the class described, a plurality of grass or fiber engaging and deflecting devices, a plurality of continuously rotating feeding rolls, a laterally swinging arm, and a funnel attached to said laterally swinging arm, and movable into alinement in said feeding rolls, as and for the purpose set forth.

11. In a device of the class described, a grass supporting rack or hopper, presser rolls having their peripheral surfaces arranged to extend into said rack or hopper to engage and press downwardly the fibers contained therein, an individual fiber selecting and deflecting and withdrawing mechanism coöperating with said rack or hopper and presser rolls.

12. In a device of the class described, a series of retainers for supporting a pile of grass or fibers, and presser rolls, said retainers arranged to direct the grass or fibers into the bite of the presser rolls, and a series of constantly rotating notched disks disposed in the path of the fibers beyond the presser rolls, as and for the purpose set forth.

13. In a machine of the class described, a twister mechanism comprising a relatively movable box and casing, yieldingly pressed pivoted jaws, said jaws being disposed to yield outwardly upon the application of a radial pressure thereon due to irregularities in the diameter of the twine passing between said jaws.

14. In a device of the class described, twister mechanism comprising a chuck or box having diagonally disposed jaws, and a spring pressed casing arranged to bear upon the sides of said jaws to normally force said jaws inwardly, as and for the purpose set forth.

15. In a device of the class described, a twister mechanism comprising a box or chuck, diagonally pivoted jaws therein, and spring pressed outwardly, and a spring pressed slidable casing for yieldingly drawing said jaws inwardly, as and for the purpose set forth.

16. In a device of the class described, twister mechanism comprising a box having yieldably mounted and inwardly directed jaws therein, and a longitudinally slidable spring pressed casing engaging said jaws on the sides thereof and pressing them normally inwardly, as and for the purpose set forth.

17. In a machine of the class described, a twister mechanism comprising a box and an inclosing casing therefor, said casing inclosing the front and sides of said box, said casing and box mounted for relative movement, twister jaws carried by one of these parts and arranged to be engaged on the sides thereof by the other of said parts, when said parts are relatively moved, and means for relatively moving said box and casing to move said jaws into gripping relation.

18. In a machine of the class described, a twister mechanism comprising a box and an inclosing casing therefor, said box and casing mounted for relative movement, twister jaws carried by one of said parts and arranged to be engaged on the sides thereof by the other of said parts, when said parts are relatively moved, whereby said jaws are moved into gripping relation, means for relatively moving said box and casing, and means for yieldingly opposing such relative movement.

19. In a machine of the class described, a twister mechanism comprising a box and an inclosing casing therefor, said box and casing mounted for relative movement endwise with respect to each other, said inclosing casing having openings through the periphery thereof, twister jaws pivotally mounted upon one of these parts and arranged to be engaged by the other of said parts when said parts are relatively moved, whereby said twister jaws are moved into gripping relation.

20. In a device of the class described, twister mechanism comprising a pair of yieldingly pressed jaws having flat opposing faces, and corresponding flanges on each, adapted to overlap the opposing jaw, as and for the purpose set forth.

21. In a device of the class described, twister mechanism comprising a pair of yieldingly pressed jaws having flat opposing faces and integral offset flanges thereon, as and for the purpose set forth.

22. In a device of the class described, means for feeding forward grass or fibers, a longitudinal hollow shaft, an expansible spool support upon said shaft, a hand wheel for tightening said support, and a thread guide rotarily mounted upon said shaft, as and for the purpose set forth.

23. In a device of the class described, means for feeding forward grass or fibers, a longitudinal hollow shaft, an expansible spool support upon said shaft, a hand wheel for tightening said support, said hand wheel being removable to permit withdrawal of the spool support, as and for the purpose set forth.

24. In a device of the class described, means for feeding forward grass fibers, a hollow shaft, conical relatively movable collars upon said shaft, intermediate blocks forming a support for the thread carrier, a thread guiding means revolubly mounted with respect to said parts, as and for the purpose set forth.

25. In a device of the class described, means for feeding forward grass or fibers, a hollow shaft having a screw threaded portion, a correspondingly threaded member having a hand wheel, and a projecting thread guiding spindle arranged to screw into said member, as and for the purpose set forth.

26. In a device of the class described, a twine forwarding mechanism, a receiving reel, driving means therefor, a removable arm carrying a sheave or pulley and arranged in the path of the twine, and means actuated by the movement of said arm for connecting or disconnecting said driving means, as and for the purpose set forth.

27. In a machine of the class described, twine forwarding mechanism, a reel, driving means therefor, a springing arm, a sheave mounted thereon, and forming a guide around which the twine is held in passing to the reel, means controlled by said arm for connecting and disconnecting said reel from its driving means, said arm being controlled by the tension of the twine passing around the pulley thereon.

28. In a device of the class described, twine forwarding mechanism, a receiving reel, a driving mechanism therefor, a movable arm carrying a sheave or pulley, means operated by the movement of said arm for operating said driving mechanism, and means for guiding the twine in a loop around said pulley or sheave.

29. In a machine for making grass twine, a grass supporting rack or hopper, presser rolls and feed disks disposed therein, and adjustable speed varying devices for driving said parts, forwarding rolls below the hopper, and thread wrapping devices driven from the main shaft, friction means on the main shaft, and a receiving reel driven by said frictional means, as and for the purpose set forth.

In witness whereof, I have hereunto set my hand this 28th day of August 1903, in the presence of the subscribing witnesses.

EDWARD W. GOODRICK.

Witnesses:
FRANK J. OTTIS,
GUY CHASE.